United States Patent [19]

Petschek

[11] Patent Number: 5,279,447
[45] Date of Patent: Jan. 18, 1994

[54] FLUID DISPENSING UNIT WITH METERED OUTFLOW

[75] Inventor: Nicholas L. Petschek, New York, N.Y.

[73] Assignee: ReSeal International Limited Partnership, New York, N.Y.

[21] Appl. No.: 929,035

[22] Filed: Aug. 12, 1992

[51] Int. Cl.⁵ ............................................. B65D 1/32
[52] U.S. Cl. .................................................. 222/105
[58] Field of Search ............... 222/321, 207, 325, 183, 222/494, 105

[56] References Cited

U.S. PATENT DOCUMENTS

| | | | |
|---|---|---|---|
| 3,124,275 | 3/1964 | Lake | 222/207 |
| 4,413,757 | 11/1983 | Adler | 222/183 |
| 4,846,810 | 7/1989 | Gerber | 222/494 |
| 5,129,550 | 7/1992 | Eschbach | 222/207 |
| 5,178,300 | 1/1993 | Haviv et al. | 222/207 |

Primary Examiner—Edwin L. Swinehart
Attorney, Agent, or Firm—Anderson Kill Olick & Oshinsky

[57] ABSTRACT

A fluid dispensing unit includes a hollow support enclosing a collapsible reservoir or container. The container has a one-way valve at its outlet for directing flow through the valve into a metering chamber. The metering chamber has an outlet connected to another one-way valve which valve prevents any backflow of contaminants into the container after fluid is dispensed. As the fluid is dispensed, the container can be collapsed to ensure complete evacuation of the fluid. Further, the metering chamber can be completely collapsed to ensure that the dispensing unit is completely empty.

18 Claims, 3 Drawing Sheets

FLUID DISPENSING UNIT WITH METERED OUTFLOW

BACKGROUND OF THE INVENTION

The present invention is directed to a closed system for the metered dispensing of a fluid from a container. A one-way valve is located at the outlet of the system affording flow out of the container while preventing any backflow of contaminants into it. Initially, the container is filled with a fluid free of air or any other gases. The one-way valve maintains the integrity of the fluid throughout its useful life even over extended time periods. The system includes means for selectively dispensing metered amounts of the fluid.

In U.S. Pat. No. 4,846,810, a valve, hereinafter called the RESEAL ® valve, is disclosed for affording one-way flow out of a container while preventing any backflow to the valve which might contain contaminants. Contaminants from outside the valve may be microorganisms, atmospheric gases, not only emptying the container, but also any metering chamber attached to the container. Maintaining the closed system for metered dispensing of the fluid and at the same time dispensing all of the fluid can present problems.

If air is present in the system it may interfere with the flow of the fluid and, in addition, has a deleterious effect on the fluid.

In the past it has been known to provide a dispensing system where the fluid flows from a container or reservoir through a one-way valve into a chamber with the fluid from the chamber being dispensed through another one-way valve. One of the problems in such a system is that air can enter into the container and contaminate the fluid being dispensed. Further, the chamber receiving the fluid from the reservoir cannot be completely emptied, so that a portion of the fluid is retained and exposed to air entering through the system outlet.

SUMMARY OF THE INVENTION

Therefore, it is the primary object of the present invention to provide a closed system for dispensing metered amounts of fluid where the fluid is maintained free of any contamination, preferably without the need for preservatives. Preservatives may adversely effect the useful life of the fluid or reduce its effectiveness.

Another primary object of the present invention is to provide a metering chamber for receiving fluid from the container and flowing it to a dispensing outlet where the chamber is capable of being substantially completely emptied. Moreover, the one-way valve between the metering chamber and the dispensing outlet assures that no contamination flows back into the chamber.

The dispensing system embodying the present invention includes a flexible collapsible reservoir or container, a support structure at least laterally enclosing the container, a chamber for holding a metered amount of fluid and a one-way valve, such as the RESEAL ® valve, connected to the chamber for dispensing metered amounts of fluid and preventing backflow of contaminants into the container during and following the dispensing operation. A one-way valve not assuring backflow prevention would not be effective in the present invention. Valves capable of blocking any backflow into the container could be used instead of the RESEAL valve.

The metering chamber is constructed so that it can be completely emptied. When the metering chamber is completely emptied a specific metered amount is dispensed. The metered amount can vary from a drop to almost any amount depending on the requirement of the metered dispensing operation. In the use of the dispensing system with drugs and pharmaceuticals relatively small amounts of the fluid may be dispensed. When the system is used for dispensing liquid foodstuffs, beverages or the like the quantity flowing from the outlet may be quite large, particularly as compared to the dispensing of drugs and pharmaceuticals.

The collapsible reservoir or container can be in a variety of forms, such as a flexible bag, a bellows-like container, or some other form which permits the complete evacuation of the fluid from the reservoir. If a bag is used, preferably it is formed of an impermeable material. The material of the bag is usually determined by the fluid being dispensed. To ensure stability of the fluid, the bag must be constructed so that air, other gases, or oils cannot flow or pass through it and mix with the fluid. Under certain conditions, it may be necessary to prevent light from entering into the container. The material forming this container can include a foil barrier layer sandwiched between other layers, such as of plastics material, to assure the impermeability of the bag.

The metering chamber can be part of the means for first drawing fluid out of the container and then directing the fluid through the one-way valve to the system outlet.

To assure that the container is completely emptied, it is enclosed within a support structure which can be closed or open at its base. An important feature is that at least a part of the support structure can breathe for maintaining atmospheric pressure in contact with the outside of the container. As the fluid is dispensed, since the container is free of air and gas, the atmospheric pressure acting on the container causes it to collapse. The fluid is dispensed by providing a compressing action on the metering chamber, whereby the fluid flows out of the metering chamber through the one-way valve. When the compressing action no longer acts on the metering chamber, since it is at least partially emptied, the metering chamber rebounds to its initial condition and draws fluid out of the container filling the chamber. The passageway between the container and the metering chamber contains another one-way valve for closing the passageway once the metering chamber is completely filled. This additional one-way valve prevents backflow into the container and is not intended to block any flow of contaminants, since such blockage is effected by the one-way valve at the system outlet. The volume of the contents within the container is reduced in direct proportion to the volume of the fluid dispensed.

A spring can be used in combination with the metering chamber to enhance its rebounding or self-restoring action.

The fluid can be dispensed in a variety of forms, for instance, drops, spray, mist, or a continuous stream. The form of the dispensed fluid is determined by the shape of the valve outlet.

In a preferred embodiment the metering chamber can be formed with bellows-like walls. Such a shape assures complete evacuation of the metering chamber so that a specific amount of the fluid is dispensed. If the metering chamber is not completely collapsed then an amount, less than the metered amount, is dispensed. It would be possible to provide means for limiting the collapse of the metering chamber so that other selected amounts of the fluid could be dispensed. The shape of the one-way valve at the outlet system can be varied depending on the material being dispensed and the desired size of the dispensing device. As shown in the RESEAL valve patent mentioned above, the valve body can be axially elongated or it can be provided in a disk shape where its axial length is a fraction of its diameter.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DETAILED DESCRIPTION OF THE INVENTION

Figure 1:
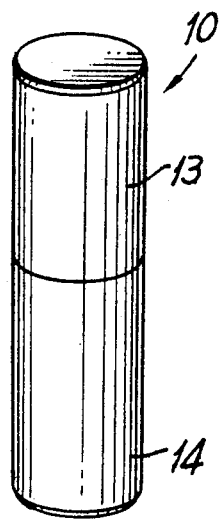
FIG. 1 is a perspective view of a fluid dispensing device embodying the present invention.
Figure 2:
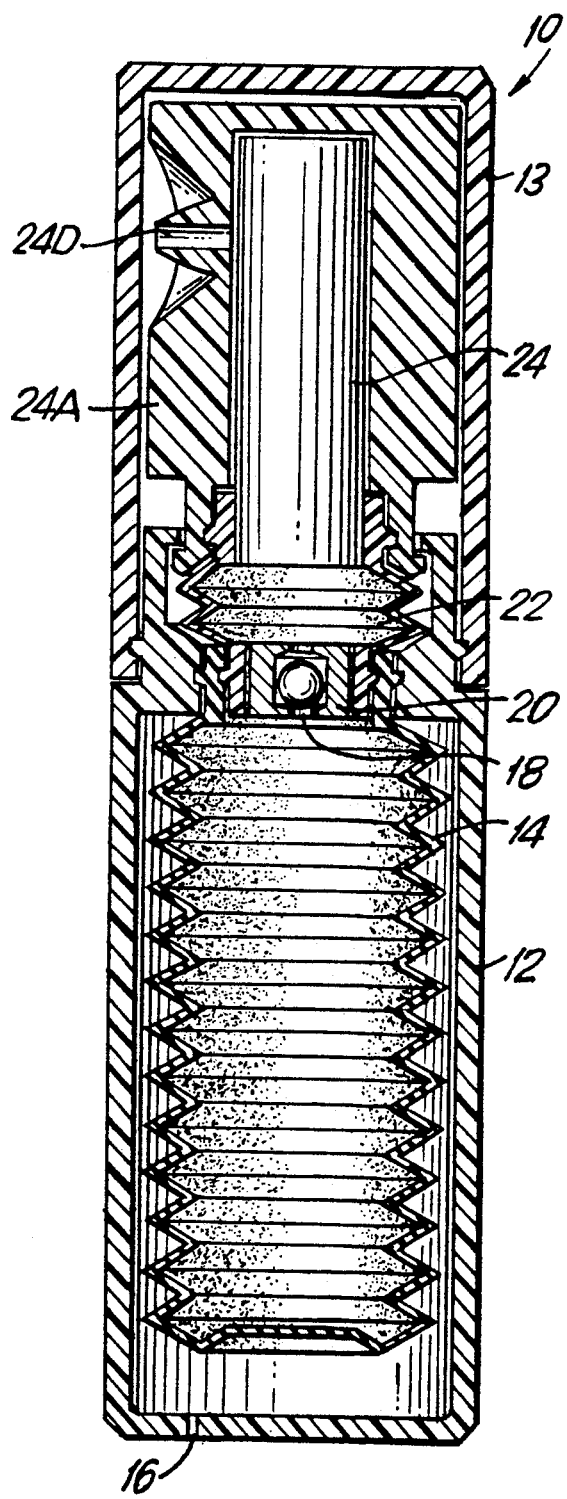
FIG. 2 is an enlarged elevational view of the device shown in FIG. 1 and illustrated partly in section.

In FIG. 1, a dispensing device 10 is illustrated, particularly for dispensing a metered amount of the fluid. The device includes a cylindrically-shaped support 12 and a cylindrically-shaped removable cover 13 extending upwardly from the support. As illustrated in FIG. 2, a reservoir or container 14 for the fluid is located within the support 12. The container 14, illustrated as a bellows-like member, is collapsible so that substantially all of its contents can be dispensed. Initially, the container 14 is completely filled with fluid so that it contains no air or other gases. The support has an opening 16 in its base for admitting ambient atmospheric pressure. Such pressure acts on the outside surface of the bellows-like container causing it to collapse as fluid is dispensed.

At its upper end, container 14 has an outlet 18 from which the fluid flows through a first one-way valve 20 into a metering chamber 22 also having a bellows-like form. The metering chamber 22 has a set volume in its fully expanded condition for dispensing a metered amount of fluid out of the chamber. The metered chamber 22 has an outlet connected to a second one-way valve 24, shown schematically. The second one-way valve 24 could be the RESEAL ® valve illustrated in FIG. 5. As explained in U.S. Pat. No. 4,846,810, the valve 24 is intended to maintain the sterility of the fluid contents of the container 14 and of the metering chamber 22. The second one-way valve 24 is positioned within a housing 24A displaceable relative to the support 12. When the housing 24A is pressed downwardly, the second one-way valve 24 moves downwardly compressing the metering chamber. Depending on the extent to which the metering chamber is compressed, a certain amount of the fluid exits through the second one-way valve 24 and is dispensed from an outlet 24D in the housing 24A. Note when the device 10 is operational, the cover 13 is removed from the support 12.

If desirable, movable stops can be arranged in the path of the housing 24A for limiting the compressing action on the metering chamber 22 for dispensing a metered amount of the fluid less than the full volume of the metering chamber.

Figure 5:
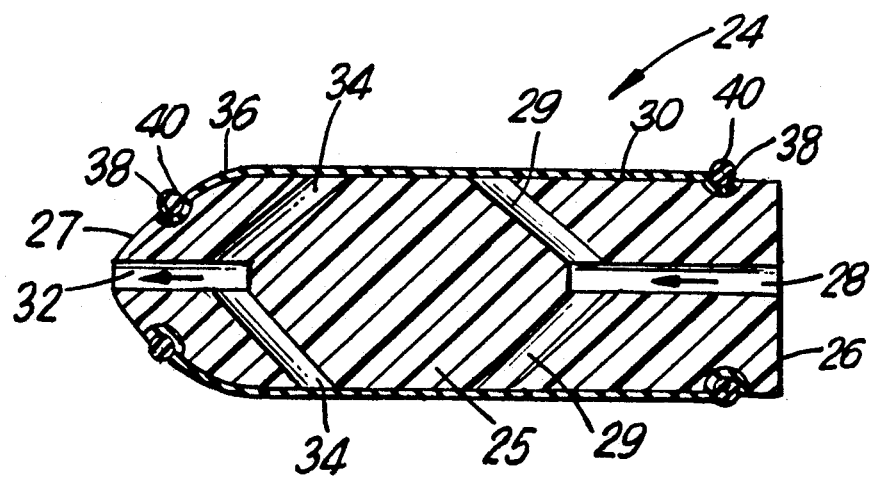
FIG. 5 is a sectional view on an enlarged scale of the RESEAL valve for use at the outlet from the fluid dispensing device in the different embodiments.

In FIG. 5, the RESEAL ® or second one-way valve 24 is shown in detail. The second one-way valve 24 has an elongated valve body 25 with an inlet end 26 and an outlet end 27. The shape of the valve body 25 may be varied depending on a variety of factors, such as the overall shape of the device, the direction in which the fluid is dispensed and the effective flow length through the valve body required for dispensing the fluid.

The inlet end 26 of the valve body 25 has a first outlet duct 28 located at the outlet of the metering chamber 22. The first outlet duct 28 extends first in the elongated axial direction of the valve body 25 and then divides into at least two angularly-disposed branch ducts 29 terminating at the outside surface 30 of the valve body 25. Toward the outlet end, there is a second outlet duct 32. The second outlet duct 32 is in general alignment with the first outlet duct 28. The second outlet duct opens from the valve body at the outlet end. Spaced from the outlet end 27, the second outlet duct 32 divides into two branch ducts 34 open through the valve body surface 30. The opening of the branch ducts 29 and 34 at the outside surface 30 of the valve body 25 are in spaced relation. A flexible sleeve-like membrane 36 tightly encloses the valve body from a location adjacent the inlet end 26 to a location adjacent the outlet end 27. As shown in FIG. 5, the membrane is held in fluid-sealed contact with recesses 38 in the valve body 25 by 0-rings 40.

When the metering chamber 22 is compressed, depending on the compression force applied, fluid in it is forced out through the first outlet duct 28 and flows into the first branch ducts 29 and then causing the flexible membrane 36 to expand outwardly from the valve body 25. Because the membrane is sealed in a fluid-tight manner to the valve body the fluid is directed between the outside surface 30 of the valve body and the inside surface of the flexible membrane and then flows into the second branch duct 34 and out through the second outlet duct 32. The flexible membrane 36 tightly closes the first and second branch outlet ducts 29, 34 when the fluid does not force the membrane 36 radially outwardly. As a consequence, after the fluid enters the second branch ducts, the membrane 36 rebounds inwardly and seals the openings into the second branch ducts and the first branch ducts preventing any backflow from the second outlet duct 32 through the valve body into the metering chamber 22. As a result, the fluid can be dispensed from the metering chamber 22 through the second one-way valve 24 and out of the second outlet duct 32 and the outlet 24D. When the fluid has been dispensed, it is impossible for contaminants, such as air, dust, gases or other material to flow through the second outlet duct 32 from the ambient atmosphere into the metering chamber 22. As a result, no contaminants can enter the container 14.

In FIG. 2 the first one-way valve 20 is shown as a ball check valve. When the metering chamber 22 is filled the pressure in the chamber forces the ball against a seat of the container outlet 18 so that during the dispensing operation the fluid cannot flow back into the container 14.

In FIG. 5 there are two first branch ducts 29 and two second branch ducts 34. It would be possible to use only one or any other convenient number of the branch ducts. Preferably the branch ducts are arranged in a spaced-apart symmetrical manner to assure the efficient flow of the fluid from the first outlet duct 28 to the second outlet duct 32.

While 0-ring seals 40 are shown holding the membrane 36 in sealed engagement with the valve body for preventing any flow of contaminants between the valve body and the membrane, other seals could be used. As an example, the membrane could be adhesively sealed to the valve body or held against the valve body in a variety of ways to assure the sealing action.

After the fluid flows out of the metering chamber 22 and is dispensed from the device 10, the compression of the metering chamber is released and it rebounds to the position shown in FIG. 2. As a result, as the metering chamber 22 expands it exerts a suction action opening the first one-way valve 20 and drawing fluid from the container so that the metering chamber is filled, ready for another dispensing step. It is important that the support 12 is open at its base or has an opening 16 for admitting air into contact with the container so that, due to the differential pressures inside and outside the container, fluid will flow gradually into the metering chamber and the container 14 will gradually collapse.

Preferably, the support 12 is formed of a relatively hard material affording protection for the container 14. The support can be made of plastics material, metal, glass or any other suitable material. If necessary, the support can be transparent providing a visual indication of the amount of fluid remaining within the container 14.

Figure 3:
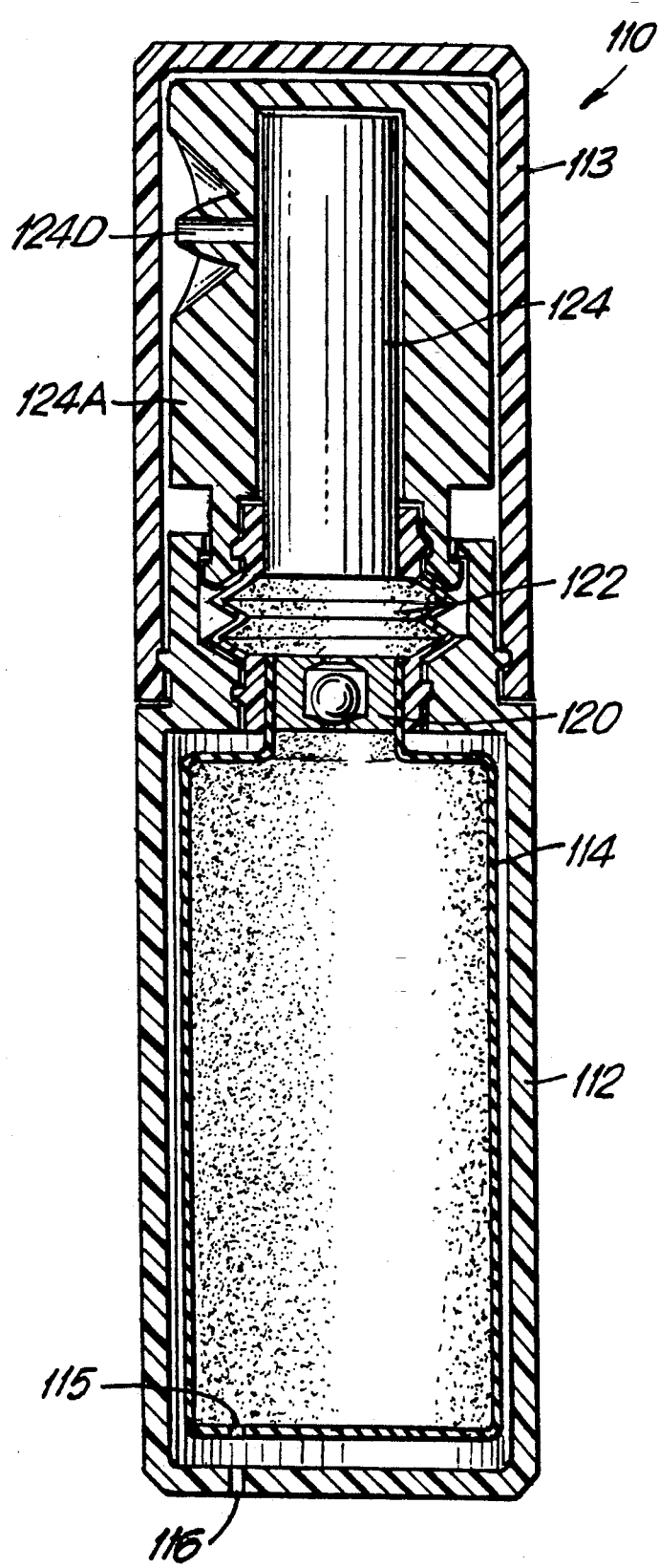
FIG. 3 is an elevational view similar to FIG. 2 of another embodiment of the present invention.

In FIG. 3, the dispensing device 110 is similar to the device shown in FIG. 1 and the same reference numerals are used with the addition of a prefix numeral. In FIG. 3 the container 114 is a flexible collapsible bag. The support 112 has an opening 116 at the bottom so that ambient atmosphere contacts the bag container and causes it to collapse as the fluid is dispensed from the container 114. The container 114 has a sealable opening 115 so that the container can be filled.

The dispensing operation for the device 110 in FIG. 3 is the same as the device in FIG. 2.

The material forming the container 114, in addition to being flexible and collapsible, must be impermeable preventing the fluids from escaping through the container wall and also preventing any flow of gas or other contaminants through the wall into the container.

Figure 4:
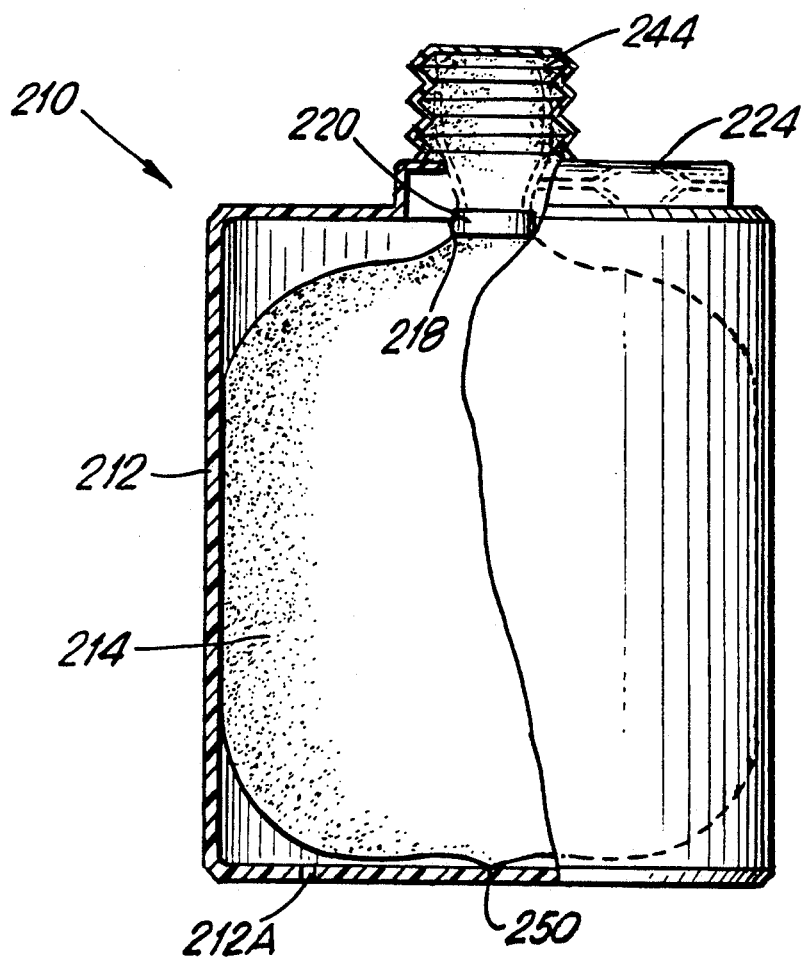
FIG. 4 is an elevational view partly in section of still another embodiment of the present invention.

In FIG. 4, another dispensing device 210 is shown generally similar to the above embodiments, however, with a different arrangement of the metering chamber 244 and the device outlet. The container 214 is enclosed within a support 212 with an opening 212A in the bottom of the support so that atmospheric air can enter and collapse the bag, assuring that its contents are substantially completely dispensed.

In FIG. 4, outlet 218 of the container opens through a first one-way valve 220 into the metering chamber 244. The first one-way valve 220 prevents backflow of fluid from the metering chamber 244 into the container 214. The container 214 is secured at the outlet 218. The metering chamber 244 is mounted on the top of the support and, as shown, may be a bellows member. When the metering chamber 244 is compressed toward the support 212, its contents are pressed out through a RESEAL ® or other second one-way valve 224 and are dispensed. When the metering chamber is released, since it has a memory, it returns to its original configuration, as shown in FIG. 4, and draws fluid out of the container 214 through the first one-way valve 220 until the metering chamber is filled. When the chamber 244 is filled, the flow out of the container stops. As the fluid flows into the chamber 244, the atmospheric pressure acting on the bag causes it to collapse to the extent of the volume of the fluid drawn into the chamber. Initially the metering chamber 244 and the container 214 are completely filled with fluid so that no air or gas is present within them.

When the dispensing device 210 is used, as the fluid is dispensed, the container 214 collapses due to the atmospheric air pressure within the support acting on the container. To be sure that the container 214 does not collapse in a manner blocking the outlet 218 into the chamber 244, the container may be connected to the support structure at one or more positions 250.

The outlet from the second one-way valve 224 can be shaped according to the manner in which the fluid is to be dispensed.

A significant feature of each of the embodiments described above, is that the container and the dispensing chamber are completely filled with the fluid to be dispensed and there is no air or other gas within them. It is also important that the support has an opening or is open-ended permitting atmospheric pressure to act on the container as the fluid is dispensed so that the container can be collapsed and all the fluid dispensed. If desirable, as originally supplied, the container can be completely filled with fluid and the dispensing chamber held in the completely compressed condition so that it is empty. When the means retaining the metered chamber in a collapsed or compressed condition is removed, the fluid will flow into the chamber and there will be a corresponding collapse of the container.

The containers can be filled with the fluid to be dispensed in a variety of ways. Preferably sealable openings are afforded in the containers for introducing fluid. Usually as originally supplied, both the container and the metering chamber are completely filled free of any air or gas. Due to the presence, of the one-way valve between the container and the metered chamber, it would be preferable to fill through the container.

While specific embodiments of the invention have been shown and described in detail to illustrate the inventive principles, it will be understood that the invention may be embodied otherwise without departing from such principles.

I claim:

1. A fluid dispensing unit comprising a collapsible container for fluid to be dispensed through a container outlet, means forming a metering chamber for receiving fluid only from said container directly through the container outlet and being collapsible from a first condition completely filled with the fluid to a second condition completely emptied of the fluid and said metering chamber arranged for selectively discharging fluid therefrom, initially the container and the metering chamber being completely filled with fluid and free of any gas and during dispensing of the fluid the container and metering chamber remain free of any gas, means forming a first one-way valve located between said container outlet and an inlet to said metering chamber for admitting flow from said container to said metering chamber and preventing any return flow from the metering chamber into the container after the metering chamber is filled, means forming a second one-way valve having an inlet and an outlet with the inlet connected to an outlet from said metering chamber for conducting a pressurized flow of the fluid from said metering chamber only through said second one-way valve to the outlet thereof and upon dispensing the fluid from the second one-way valve outlet for completely preventing backflow through said second one-way valve into the metering chamber, and flow out of said metering chamber takes place only when said metering chamber is collapsed towards the second condition.

2. A fluid dispensing unit, as set forth in claim 1, wherein said container is laterally enclosed within a support member, and said support member arranged to admit atmospheric pressure into contact with said container exterior.

3. A fluid dispensing unit, as set forth in claim 1, wherein said metering chamber has collapsible walls and said collapsible walls rebound towards the first condition after at least some of the fluid in the metering chamber is dispensed through the second one-way valve.

4. A fluid dispensing unit, as set forth in claim 3, wherein said collapsible walls of said metering chamber have a bellows form whereby the bellows form is completely collapsed in the second condition and is fully expanded in the first condition.

5. A fluid dispensing unit, as set forth in claim 1, wherein said means forming the second one-way valve comprises a valve body, a first outlet duct extending through said valve body and in flow communication with the outlet from said metering chamber, a second outlet duct extending through said valve body and spaced from said first outlet duct, a flexible membrane tightly laterally enclosing an outside surface of the valve body with each of said first outlet duct and second outlet duct opening from said valve body to an inside surface of said flexible membrane, means for sealing said flexible membrane to said valve body, said flexible membrane being expandable by pressurized fluid from the metering chamber so that the fluid flows first through the first outlet duct into a space between the valve body and the flexible membrane and then through the second outlet to the ambient atmosphere with the flexible membrane rebounding into sealing contact with the valve body for sealing the first and second outlet duct opening from said valve body after the fluid flows out of the second outlet.

6. A fluid dispensing unit comprising means forming a collapsible container for holding fluid to be dispensed, said container having an outlet, a collapsible metering chamber having an inlet for receiving fluid directly only from the container outlet and an outlet, said metering chamber having an inside space for fluid to be dispensed with the inside space being volumetrically changeable from a completely filled condition to a completely emptied condition, when initially commencing dispensing of fluid from said dispensing unit the container and the metering chamber being completely filled with fluid and free of any gas and during dispensing of the fluid the container and metering chamber remain free of any gas, means forming a first one-way valve located between said container outlet and said metering chamber inlet for admitting the flow of the fluid into the inside space of said metering chamber until the metering chamber is in the completely filled condition and for preventing flow of the fluid from the chamber into the inside space of said metering chamber until the metering chamber is in the completely filled condition and for preventing flow of the fluid from the chamber into the container when the inside space is in the completely filled condition, means forming a second one-way valve having an inlet and an outlet with the inlet connected to said outlet from said metering chamber for conducting a pressurized flow fluid from the inside space in said metering chamber only through said second one-way valve to the outlet thereof and upon release of the pressurized flow for completely preventing a backflow into the inside space of the metering chamber from the outlet of said second one-way valve, and flow out of said metering chamber takes place only when said metering chamber is collapsed towards the second condition.

7. A fluid dispensing unit, as set forth in claim 6, wherein said second one-way valve comprises a valve body, a first outlet duct extending through said valve body, a second outlet duct extending through said valve body and spaced from said first outlet duct, a flexible membrane tightly laterally enclosing an outside surface of said valve body and each of said first outlet duct and second outlet duct opening from said valve body through said outside surface to an inside surface of said flexible membrane, means for sealing said flexible membrane to said valve body in a fluid-tight manner so that flow passes in turn only through said first outlet duct between the inside surface of said flexible membrane and the outside surface of said valve body and said second outlet duct and said flexible membrane being expandable by the pressurized flow of fluid out of the inside space of said metering chamber.

8. A fluid dispensing unit, as set forth in claim 7, wherein a rigid support at least laterally encloses said container.

9. A fluid dispensing unit, as set forth in claim 8, wherein said container is a flexible bag.

10. A fluid dispensing unit, as set forth in claim 9, wherein said container is a collapsible bellows member.

11. A fluid dispensing unit, as set forth in claim 8, wherein said container is a collapsible bellows member.

12. A fluid dispensing unit, as set forth in claim 6, wherein said metering chamber has a memory so that after the pressurized flow of fluid out of the collapsed inside space, said metering chamber expands to its original shape and draws fluid out of said container outlet through said first one-way valve for filling the inside space and returning it to the completely filled condition.

13. A fluid dispensing unit, as set forth in claim 12, wherein the inside space of said metering chamber has a set volume in the completely filled condition of the inside space whereby the pressurized flow of fluid can be pressed out of the inside space up to the set volume.

14. A fluid dispensing unit, as set forth in claim 8, wherein a housing encloses said second one-way valve and is displaceably mounted on said support, so that by pressing said housing toward said support said one-way valve connected to said metering chamber compresses said metering chamber for dispensing a selected amount of fluid from the inside space therein.

15. A fluid dispensing unit, as set forth in claim 14, wherein said housing having an outlet opening in register with said second outlet duct for dispensing fluid out of said one-way valve.

16. A fluid dispensing unit, as set forth in claim 15, wherein a cover is removably secured to said support and encloses said housing, and dispensing of the fluid is achieved only after removal of said cover from said housing.

17. A fluid dispensing unit, as set forth in claim 6, wherein said container has a sealable opening for filling the container with fluid to be dispensed.

18. A fluid dispensing unit, as set forth in claim 8, wherein said rigid support has an upright axis, said metering chamber is mounted on said support and extends upwardly therefrom in generally parallel relation with the upright axis of said support, said metering chamber being collapsible toward said support, and the outlet from said metering chamber being located adjacent to said support.

* * * * *